UNITED STATES PATENT OFFICE.

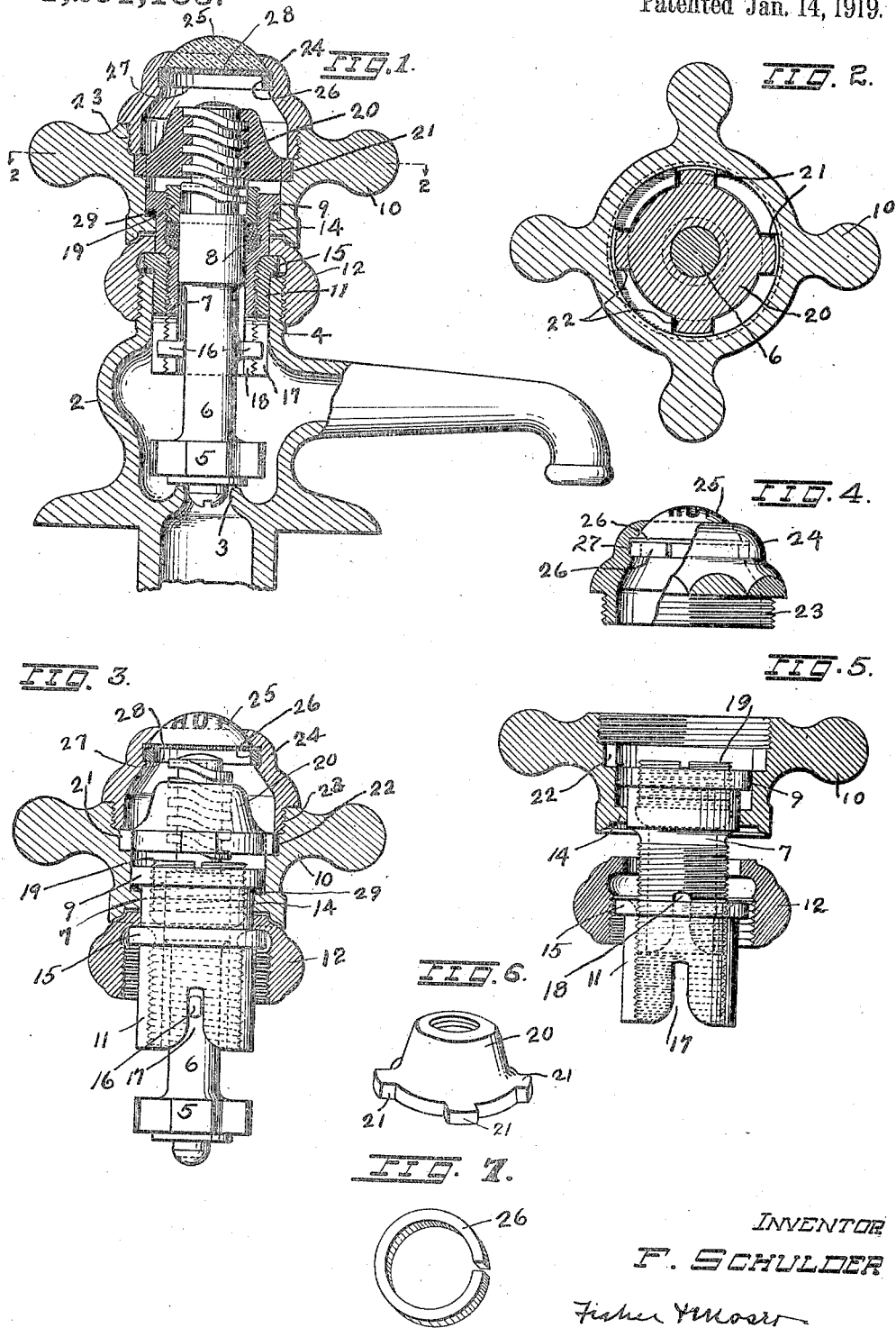

FRED SCHULDER, OF CLEVELAND, OHIO, ASSIGNOR TO UNITED BRASS MANUFACTURING COMPANY, OF CLEVELAND, OHIO, A PARTNERSHIP COMPOSED OF WM. J. SCHOENBERGER AND BENJAMIN F. KLEIN.

VALVE.

1,291,183.   Specification of Letters Patent.   Patented Jan. 14, 1919.

Application filed August 20, 1917.  Serial No. 187,151.

*To all whom it may concern:*

Be it known that I, FRED SCHULDER, citizen of the United States, residing at Cleveland, in the county of Cuyahoga and State of Ohio, have invented certain new and useful Improvements in Valves, of which the following is a specification.

This invention appertains to an improvement in valves, and the invention is especially applicable to that type of a valve known as a compression cock. The bodies and handles of such cocks vary in shape and design, but it is desirable in shop practice and for trade convenience to have a standard pattern or design of compression cock which will match other types of valves in so far as exterior appearances go. Thus, one of the objects of this invention is to provide a simple and practical valve-operating organization of parts which may be substituted for a self-closing valve mechanism in a body suitable for use with both, and which will match the other exteriorly in size and design so that two differently operating valves may be used as a matched set in a lavatory basin. Outwardly the valves or cocks would be alike but internally the construction would be different, except that the respective parts would be made of standard size to fit the same body and permit substitution of one valve mechanism for the other. Thus, a pair of self-closing valve parts might be instantly changed for a pair of compression valve parts, or vice versa, or one valve of a pair on a basin might be equipped for self-closing operations, and the other valve equipped for compression operations.

In the accompanying drawings, Figure 1 is a central vertical section through a valve body and its operating parts constructed according to my invention. Fig. 2 is a plan section on line 2—2, Fig. 1. Fig. 3 is a side elevation and section of the valve operating parts as they appear assembled for attachment to a valve body. Fig. 4 is a side view, partly in section, of the index cap for the handle, and Fig. 5 is a section and side view of various parts partly disassembled or separated. Fig. 6 is a perspective view of the screw nut which forms a removable part of the handle, and Fig. 7 is a perspective view of the split spring ring for securing the index member within the handle cap.

As shown, the valve or compression cock comprises a chambered body 2 having a valve seat 3 axially opposite an externally screw-threaded neck 4, and the valve-operating parts are removably seated within and upon this neck. Thus, the valve head 5 which is adapted to engage seat 3 has a screw-threaded stem 6 slidably mounted within a slotted sleeve 7. This sleeve is screw-threaded externally where reduced in diameter, and its upper enlarged portion is recessed to receive packing material 8 and has an annular flange 9 to secure a chambered handle 10 rotatably in place thereon. A flanged thimble 11 of smooth exterior and screw-threaded internally is screw engaged with sleeve 7, and a union or coupling nut 12 is rotatably secured upon the enlarged round portion of sleeve 7 between the recessed bottom 14 of handle 10 and the upper face of flange 15 of thimble 11. Nut 12 is rotatable independently of the handle and serves to fasten thimble 11 immovably within neck 4, and the valve stem 6, sleeve 7 and thimble 11 are locked against independent rotation by a pair of radial lugs 16 integral with the stem and projected to slide within the registering slots 17 and 18 in the sides of thimble 11 and sleeve 7, respectively. A screw ring 19 encircles the valve stem at the upper end of sleeve 7 and serves to confine and compress the packing 8. Fiber or other suitable anti-friction material is preferably used beneath flange 9, and packing material beneath flange 15.

Uplift of valve head 5 is accomplished by rotating handle 10 but without a rising movement of the handle, the screw-threaded upper extremity of stem 6 being engaged by a screw collar 20 having radial projections 21 which occupy radial recesses 22 within handle 10. Collar 20 is locked immovably in place within the handle by the screw-threaded rim 23 of the index carrying cap 24 bearing down upon the projections 21. Cap 24 is hollow and elevated to confine the tapered body of the collar and provide sufficient room beneath the index button 25 for upward travel of the valve stem. The index button is removably held within the central opening in the cap by a split ring 26 secured in spring-seating position within an internal annular channel 27 adjacent the border of the central opening, and a rubber or other cushioning disk or washer 28 is interposed between the button and ring to effect a firm lock and eliminate looseness between the parts.

In operation, the handle may be turned without rising from its seat, and the valve stem will be raised or lowered without rotating relatively to its seat. When the valve head 5 engages the valve seat 3 the tendency is to lift the handle slightly and shift the thrust to the bearing washer 29 between flanges 9 and 14. The simple act of unscrewing the union nut 12 from neck 4 permits removal of all the valve operating parts together as shown in Fig. 3, and these parts may be easily assembled or disassembled as indicated by the partial separability of the elements in Fig. 5. Externally these parts appear to be the duplicate of the self-closing faucet shown in my pending application for Patent Serial No. 149,156, filed Feb. 17, 1917, and may be substituted therefor in the same body where a manual compression movement is desired instead of a self-closing movement.

What I claim is:

1. A valve stem having lugs, a slotted member in sleeved engagement with said stem and its lugs, a coupling nut and a handle rotatably engaged with said member, a screw collar centrally affixed upon said handle in screw connection with said stem, and a cap member to secure and inclose said collar within said handle.

2. A valve stem, a flanged sleeve for said stem, a flanged thimble about said sleeve, said stem, sleeve and thimble non-rotatably connected together, a coupling nut and a hollow handle rotatably secured in juxtaposition upon said sleeve and thimble and comprising portions located between the flanges of the sleeve and thimble, a screw-threaded member in screw connection with said stem, and means to secure said member within said handle.

3. A valve operating mechanism adapted to be inserted into a chambered valve body, comprising a valve having a screw stem, a pair of supporting members for said stem non-rotatably connected thereto, a coupling nut and a hollow handle having independent rotatable connection with said supporting members, a screw-collar for said stem having a detachable interlocking connection with said handle, and a screw cap for said handle bearing against said collar.

4. A valve having a screw stem, a flanged supporting sleeve for said stem having a recess, packing and a packing ring within said recess, a flanged thimble screw-engaged with said sleeve, means to prevent said stem and sleeve and thimble from rotating independently, a coupling nut and a hollow handle independently rotatable and comprising portions located between the flanged portions of said sleeve and thimble, a screw-threaded collar having screw connection with said stem, and means to lock said collar immovably within said handle.

5. A valve body, a valve having a stem screw-threaded at its top, a supporting sleeve about said stem and in which the stem is confined to vertical movements and a handle independently rotatable upon said sleeve and partially surrounding the same, said sleeve having coupling connection with said valve body and said handle having connection with the screw on said stem.

6. A valve body, a valve and a stem therefor having a screw-threaded extremity, a rotatable handle and a screw collar detachably affixed therein in screw engagement with said extremity, and a support for said handle and stem comprising a sleeve, a coupling nut removably engaged with said body and a thimble between said body and said sleeve.

7. A valve body, a valve having a screw-threaded stem, a hollow handle, a screw-collar engaging said stem and removably seated within the interior of said handle and interlocked therewith and means securing said handle and said stem in detachable connection with said body comprising a coupling nut and a sleeve within said body and about said stem and engaged by said handle and said nut.

8. In a compression cock, a chambered body, a valve stem having a screw-threaded extremity, means to secure the stem upright within the said body comprising a sleeve and a thimble about the same in the body, a hollow handle rotatably secured upon said sleeve, a screw collar interlocked with said handle and screw-engaged with said stem within said handle, a cap covering said collar and stem and a coupling nut confining said parts on said body.

Signed at Cleveland, in the county of Cuyahoga, and State of Ohio, this 17th day of August, 1917.

FRED SCHULDER.

Copies of this patent may be obtained for five cents each, by addressing the "Commissioner of Patents, Washington, D. C."